(12) United States Patent
Ried et al.

(10) Patent No.: US 9,929,622 B2
(45) Date of Patent: Mar. 27, 2018

(54) REDUNDANT MODULAR PIVOT ANGLE MOTOR

(71) Applicant: Liebherr-Aerospace Lindenberg GmbH, Lindenberg (DE)

(72) Inventors: Georg Ried, Scheidegg (DE); Albert Petretti, Lindenberg (DE); Philipp Kegel, Heimenkirch (DE); Christian Schilling, Maierhoefen (DE); Michael Koros, Lindenberg (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 365 days.

(21) Appl. No.: 14/871,790

(22) Filed: Sep. 30, 2015

(65) Prior Publication Data

US 2016/0099628 A1 Apr. 7, 2016

(30) Foreign Application Priority Data

Oct. 1, 2014 (DE) .................. 10 2014 014 588

(51) Int. Cl.
| | |
|---|---|
| H02K 16/00 | (2006.01) |
| H02K 7/00 | (2006.01) |
| H02K 7/108 | (2006.01) |
| H02K 7/08 | (2006.01) |
| H02K 11/00 | (2016.01) |
| F16D 7/02 | (2006.01) |

(52) U.S. Cl.
CPC .......... *H02K 7/003* (2013.01); *H02K 7/083* (2013.01); *H02K 7/108* (2013.01); *H02K 11/0015* (2013.01); *H02K 16/00* (2013.01); *F16D 7/02* (2013.01); *F16D 2300/18* (2013.01)

(58) Field of Classification Search
CPC ............................. H02K 16/00; H02K 7/108
USPC ....................... 310/67 R, 75 R, 79, 112, 114; 251/129.11
See application file for complete search history.

(56) References Cited

U.S. PATENT DOCUMENTS

| | | | | |
|---|---|---|---|---|
| 4,168,459 | A * | 9/1979 | Roesel, Jr. ............. | H02J 9/066 310/112 |
| 7,309,938 | B1 * | 12/2007 | Smith .................. | H02K 7/1807 310/112 |
| 8,680,730 | B2 * | 3/2014 | Lordo ...................... | H02K 3/28 310/112 |
| 2004/0247383 | A1 * | 12/2004 | Chang ................... | F04D 19/007 403/329 |
| 2006/0113933 | A1 * | 6/2006 | Blanding ................ | B64C 13/00 318/116 |
| 2009/0218898 | A1 * | 9/2009 | Ribeiro .................. | H02K 7/003 310/112 |
| 2012/0280585 | A1 * | 11/2012 | Shaffer .................. | H02K 7/116 310/83 |
| 2015/0038241 | A1 * | 2/2015 | Jennings ............... | H02K 49/108 464/29 |

(Continued)

FOREIGN PATENT DOCUMENTS

DE 19545513 A1 * 6/1997 ............... F16D 3/02

*Primary Examiner* — Jeremy Luks
(74) *Attorney, Agent, or Firm* — McCoy Russell LLP

(57) ABSTRACT

This present disclosure relates to a motor arrangement for controlling pilot valves having at least three motors, having at least one stator each and at least one rotor each, wherein the motors are provided at a common rotating shaft, with each motor being coupled to the rotating shaft via at least one respective mechanical coupling.

18 Claims, 4 Drawing Sheets

(56) References Cited

U.S. PATENT DOCUMENTS

2017/0217600 A1* 8/2017 Regev .................... B64D 35/02

* cited by examiner

REDUNDANT MODULAR PIVOT ANGLE MOTOR

CROSS REFERENCE TO RELATED APPLICATION

This application claims priority to German Patent Application No. 10 2014 014 588.3, entitled "Redundant Modular Pivot Angle Motor," filed on Oct. 1, 2014, the entire contents of which is hereby incorporated by reference in its entirety for all purposes.

TECHNICAL FIELD

The present disclosure relates to a redundant modular pivot angle motor which is configured as a motor arrangement having at least three motors.

BACKGROUND AND SUMMARY

Pivot angle motors of this category having corresponding break-out couplings serve the control of hydraulic pilot valves and thus represent the heart of so-called "direct drive" valves. Such direct drive valves control the position of one or more hydraulic control slide valves, i.e., without hydraulic reinforcement, by a regulated electric current. In some approaches, a fixed, invariable number of motors is provided and coupled to one another on one axle for such applications in this respect. The construction design of the overall motor or of the whole motor arrangement is in this respect may be driven and determined by the selected redundancy concept and may be designed and optimized individually in each case for this concept or for its exact number of motors. It is not easily possible to vary a selected redundancy concept with respect to the number of motors. Prior approaches may not account for the individual position measurement of the motor elements or of the individual motors, and thus there may not be a possibility of electronic monitoring of the smooth running and controlled movement of individual motor stator parts.

It is the object of the present disclosure to provide an improved motor arrangement for controlling pilot valves which can be varied more flexibly with respect to the number of motors used and with which a simplified individual position measurement of the motors is possible.

This object is achieved in accordance with the present disclosure by a motor arrangement for controlling pilot valves comprising at least three motors, the motors comprising at least one stator each and at least one rotor each, wherein the motors are provided at a common rotating shaft, with each motor being coupled to the rotating shaft via at least one respective mechanical coupling.

In this way, a modular cascadable arrangement of motors is provided which can be identical motors which are attachable in a redundant manner to a common shaft and which in this respect can be provided in different numbers without further construction modifications of the arrangement. In one example, the motor arrangement comprises at least three motors. In other embodiments, there is a threefold, fourfold, or sixfold redundancy of the motors. The redundant motor elements which comprise at least one stator each and at least one rotor each can in this respect be attached behind one another in an axial direction on a common rotating shaft.

In one example at least one respective electrical position sensor is provided at each motor.

It is advantageously possible with the aid of the position sensor to measure the current angle of deflection of the associated motor or motor element. For example, this sensor can serve both the exact regulation of the angular position and the monitoring of the movement of the motor or of the motor element.

In one example the coupling comprises at least one outer coupling part, at least one inner coupling part and at least one yoke spring arrangement, wherein the yoke spring couples the outer coupling part and the inner coupling part in normal operation of the corresponding motor and decouples them from one another in an improper operation.

In this way, the connection between the rotor and the rotating shaft is thus advantageously not rigid, but rather implemented via the mechanical coupling. The rotating shaft can thereby be moved onward while applying a defined break-out force in the event of a jamming of the stator and of the associated rotor, which corresponds to an improper operation of the corresponding motor. In this respect, the term normal operation of the motor means that operation in which no jamming or case of jamming is present between the stator and the rotor. With a redundant arrangement of at least three motors or motor elements, individual, jamming rotor segments can thus be pressed over by the other, non jamming motors in the sense of a majority decision.

In one example the rotor may be coupled to the outer coupling part by means of pins and by means of at least one ring. An advantageously simple coupling of the named components is hereby made possible.

In a further example two couplings may be provided between at least two motors. A coupling can in this respect be associated with the respective adjacent motor, with the couplings and the motors being able to be spaced apart from one another in an axial direction. The motors and couplings can in this respect extend substantially in parallel radially outwardly away from the rotating shaft. The radial extent of the overall arrangement is advantageously kept small in this respect.

In another example separating disks may be provided between at least two couplings. A mechanical separation between the couplings is thus established which allows an advantageously low-disturbance, separate functioning of the couplings.

In a further example couplings are provided which are the same and/or motors are provided which are the same or that couplings which are the same and motors which are the same are provided offset from one another at the common rotating shaft.

In this way, the inexpensive multiple use of the same components is thus advantageously possible which can furthermore be used in different numbers and in this respect without various substantial modifications to the overall arrangement. A larger range of motor arrangements having different numbers of motors can thus be provided using the same basic construction.

In another example position sensors are provided which are the same and/or that the position sensors are provided within a housing of the motor arrangement and/or that the position sensors are coupled with the outer coupling part and/or that the position sensors are differential transformers.

The integration of the position sensors in the housing and the connection of the sensors to the outer coupling parts causes an advantageously smaller mass of the arrangement with a correspondingly reduced inertia of the moving parts of the motors. The maximum required torque can thus be kept low, whereby the motor dimensions can also be kept small. The provision of the sensors of an otherwise necessary disturbance suppression apparatus is also not necessary since in the case of the disturbance or jamming of a sensor the coupling allows a further movement of the rotating shaft.

In one example the rotating shaft is supported via dual bearings.

In the case of a degradation of a bearing surface or of one or more rolling elements, the second, undegraded part of the dual bearing can continue to enable a further movement of the rotating shaft with a small frictional resistance.

Further details and advantages of the present disclosure will be shown with reference to the Figures.

BRIEF DESCRIPTION OF THE FIGURES

FIGS. 1-3 are drawn to scale, although other relative dimensions may also be used.

DETAILED DESCRIPTION

Figure 1:
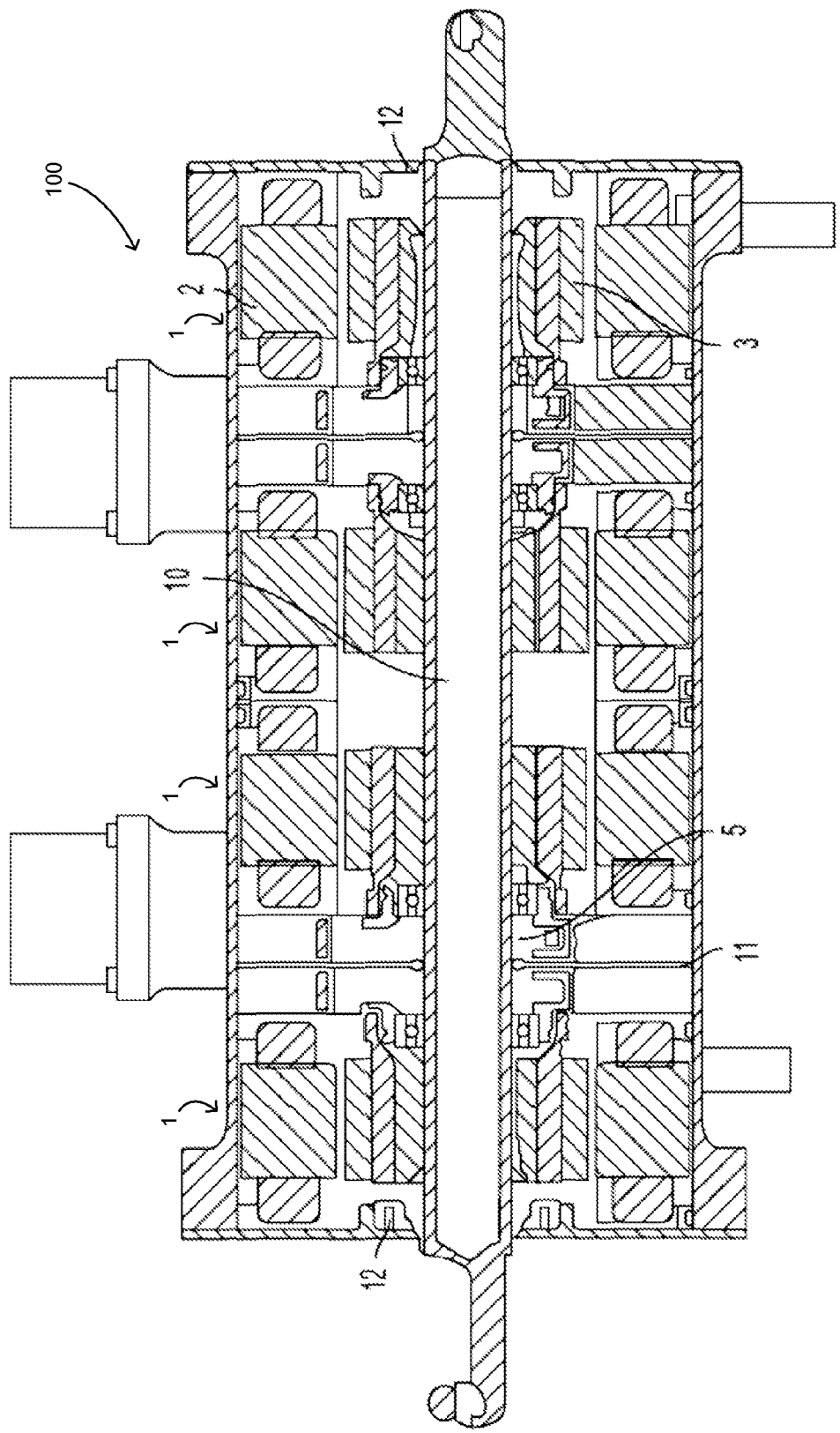
FIG. 1 shows a cross-section of a motor arrangement in accordance with the present disclosure.
Figure 4:
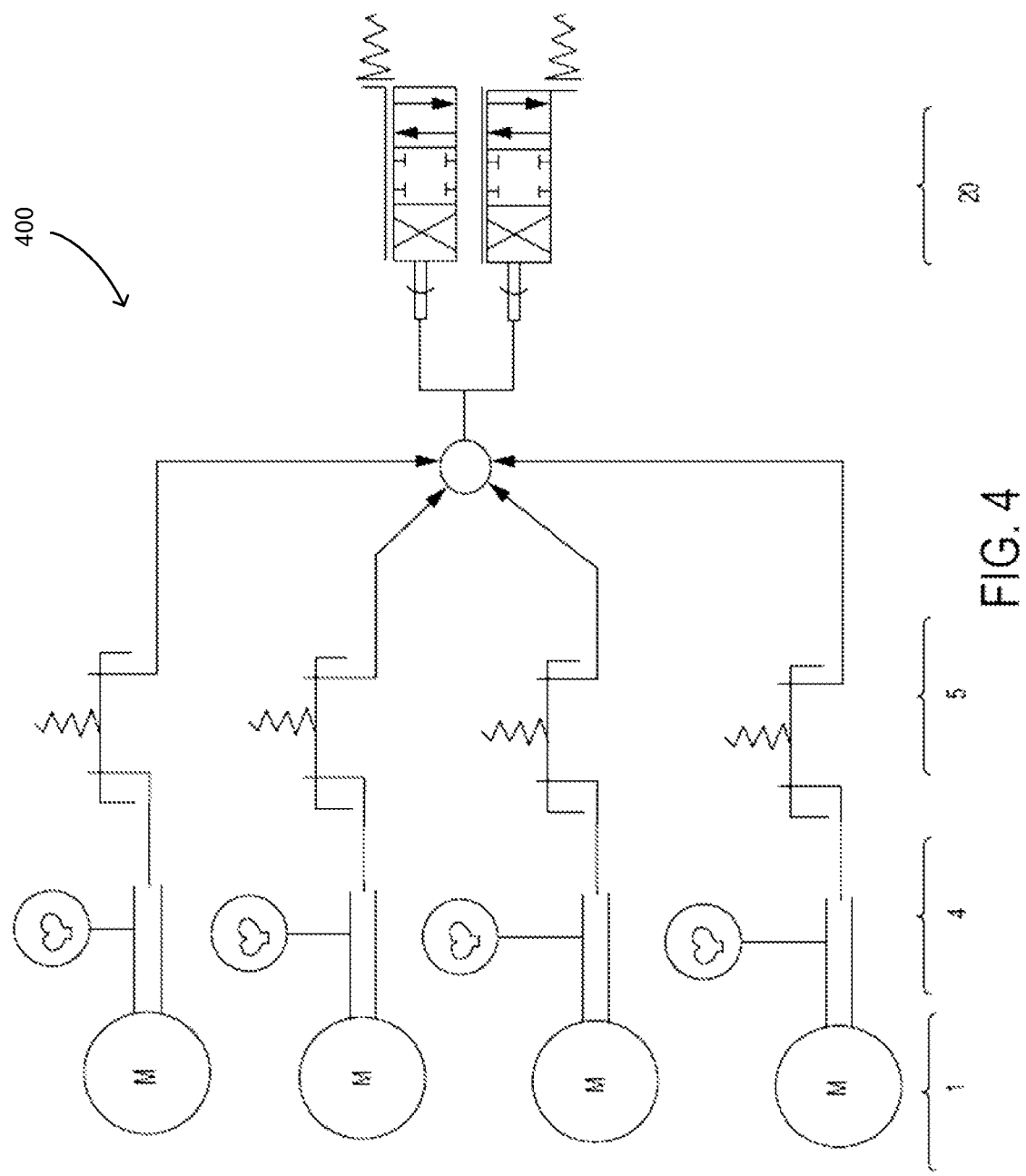
FIG. 4 shows a functional block diagram of a motor arrangement in accordance with the present disclosure with fourfold redundancy.

FIG. 1 shows a motor arrangement 100 in accordance with the present disclosure for controlling pilot valves 20 shown in FIG. 4. The present embodiment comprises four motors 1 with one stator 2 each and one rotor 3 each. The motors 1 are provided at a common rotating shaft 10, with each motor 1 being coupled to the rotating shaft 10 via a mechanical coupling 5.

The motors 1 and the couplings 5 can be substantially components of hollow cylindrical shape or of annular shape. In this respect, a respective leadthrough for the rotating shaft 10 can be provided in their center. The rotating shaft 10 can thus be the central component of the arrangement about which further components of the arrangement are grouped.

Separating disks 11, which effect a mechanical separation of the couplings 5, can furthermore be provided between the couplings 5. The separating disks 11 can in this respect be in the form of perforated disks or can be of hollow cylindrical shape. In the shown embodiment of FIG. 2, a total of two separating disks 11 are provided. It is also conceivable not to arrange the respective separating disks between two couplings 5, but rather respectively between a coupling 5 and a motor 1 not associated with it.

Each stator 2 of the motors 1 has at least one contact surface via which it is in contact with the housing of the motor arrangement via a radially outwardly disposed region of the stator 2. A good heat exchange between the components is hereby made possible, whereby the motor temperature can be kept in a desired range during operation. As can be seen from FIG. 1, the rotating shaft 10 is supported at the housing of the motor arrangement at its axially outwardly disposed support regions via a total of at least two dual bearings 12. The housing of the motor arrangement can in this respect be designed as a metal housing. The dual bearings 12 can in this respect comprise at least two concentrically arranged rolling regions. It better enables that, on a defect in one of the rolling regions, the other rolling region allows a low-friction continued rotation of the rotating shaft 10.

Figure 2:
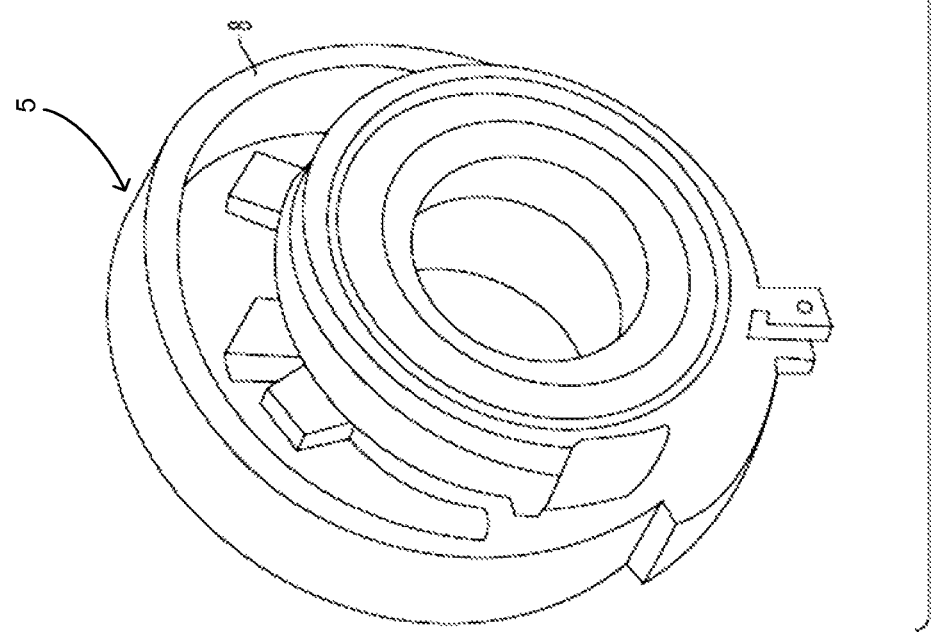
FIG. 2 shows views of a mechanical coupling.
Figure 2:
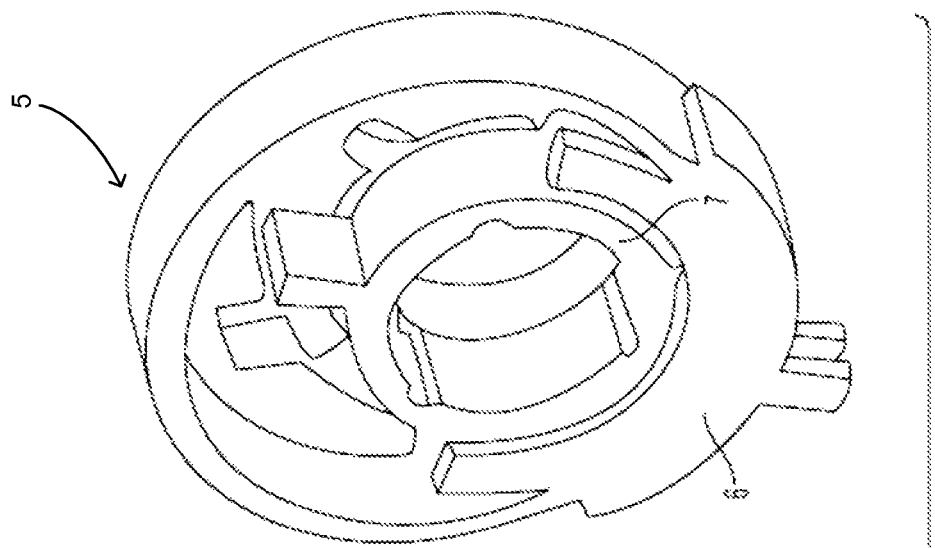

FIG. 2 shows two perspective views of the coupling 5. It can be recognized in this respect that an inner coupling part 7 is provided within the outer coupling part 6. The outer coupling part 6 and the inner coupling part 7 are releasably connected to one another by means of a yoke spring 8. The outer coupling part 6 is connected to a motor 1 and the inner coupling part 7 is connected to the rotating shaft 10. The inner coupling parts 7 of the couplings 5 can be coupled to the rotating shaft 10 by means of parallel pins. For this purpose, corresponding grooves can be provided at the inner coupling parts 7 and at the rotating shaft 10, with the pins being at least partly supportable in the grooves. The rotor 3 can be fastened to the outer coupling part 6 by means of a ring and can transmit a torque by a parallel pin. In one example, the coupling has two exterior cylindrical surfaces, one smaller than the other and each having different, but parallel, central axes.

Each of the rotors 3 is connected to the rotating shaft 10 via a separate coupling 5. In the case of a disturbance or of a blocking between a rotor 3 and its stator 2, the coupling 5 allows a further movement or rotation of the rotating shaft 10.

As soon as the torque which is transmitted between the outer coupling part 6 and the inner coupling part 7 exceeds a normal operating value, or threshold, the yoke spring 8 yields and allows a relative rotary movement between the outer coupling part 6 and the inner coupling part 7.

The yoke spring 8 can in this respect be shaped as a C-shaped component which allows a releasable connection of the outer coupling part 6 and of the inner coupling part 7 by means of its end sections. A middle arc section of the yoke spring 8 can in this respect exert a restoring and fixing force on the outer coupling part 6 and on the inner coupling part 7 in accordance with its elasticity, whereby both components are coupled to one another within certain thresholds.

In one example, the outer coupling part 6 and the inner coupling part 7 may in substantial parts comprise at least one annular structure each. The outer coupling part 6 can furthermore comprise a fork section in which the inner coupling part 7 is at least partly supportable. Furthermore, abutments at the outer coupling part 6 and at the inner coupling part 7 may, for example, limit a relative movement between the outer coupling part 6 and the inner coupling part 7. The outer coupling part 6 can furthermore comprise a connection section via which the outer coupling part 6 can be coupled to a position sensor 4.

Figure 3:
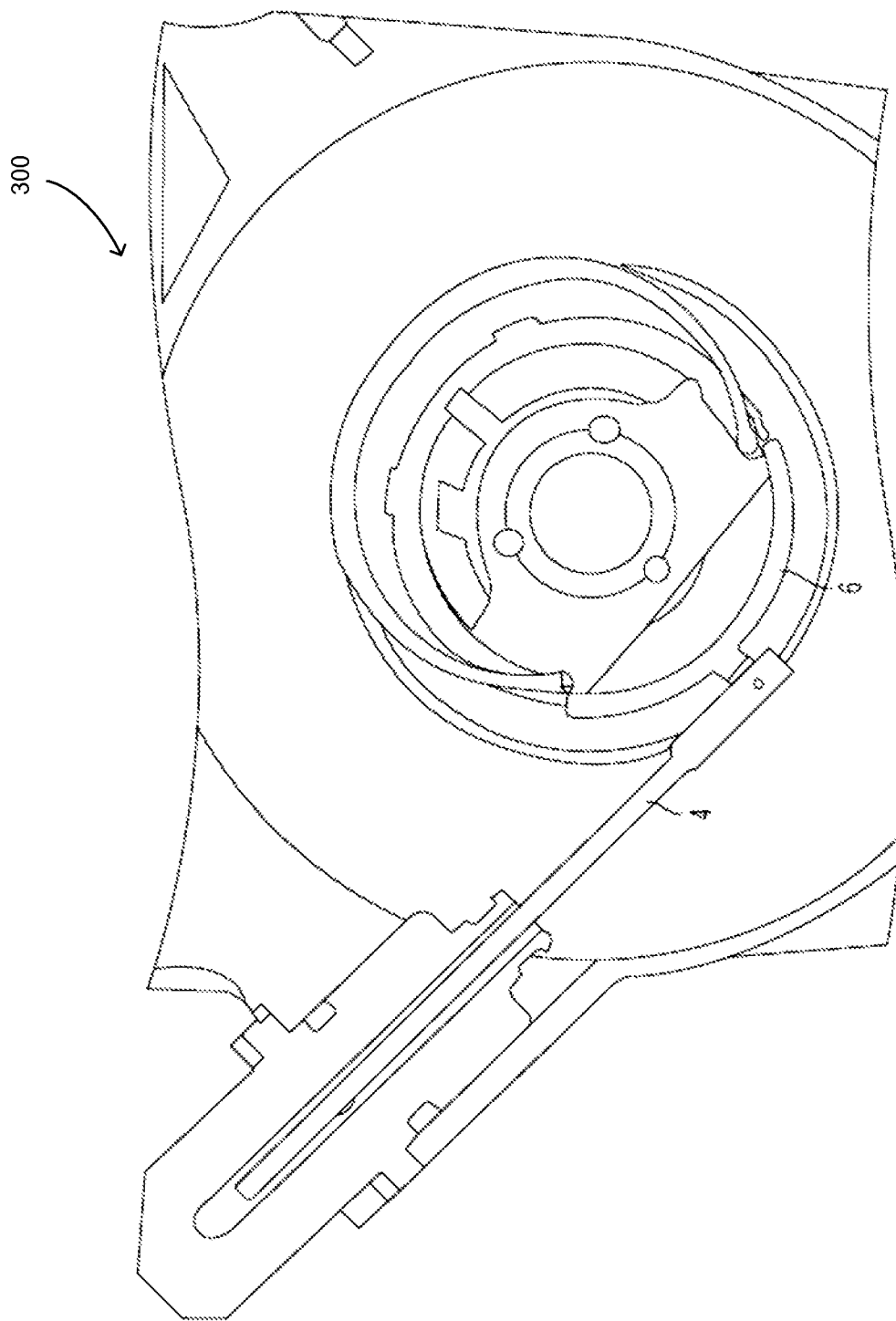
FIG. 3 shows a detailed view of a position sensor.

FIG. 3 shows an embodiment 300 of a detailed view of a position sensor 4 which is coupled to the outer coupling part 6 of a coupling 5. Position sensors 4 can in this respect respectively be provided at each outer coupling part 6 of all couplings 5 provided in the arrangement, such as motor arrangement 100.

The position sensor 4 is in this respect coupled to the outer coupling part 6 via the connection section. In one example, the position sensor 4 can detect a restricted angular range of the motor movement of the motor 1. Alternatively or additionally, a position sensor 4 may detect complete revolutions of the motor 1.

FIG. 4 shows a functional block diagram of a motor arrangement 400 in accordance with the present disclosure with fourfold redundancy, i.e., with four motors 1. A pilot valve 20 shown by way of example is in this respect controlled in parallel by four motors 1 which are coupled to the pilot valve 20 via four couplings 5. In this respect, at least one position sensor 4 is provided at each of the motors 1. If a blocking of one of the motors 1 and/or of the position sensors 4 occurs, they can be decoupled from the pilot valve 20 by means of the coupling 5 associated with them. The pilot valve 20 can continue to be operated by the three non-decoupled motors 1. In one example, the motors may be controlled individually, e.g., decoupled upon an indication of a non-normal operation.

The pilot valve 20 shown is a 4/3 way valve in the embodiment of FIG. 4. The present application is, however, not restricted thereto. Numerous conceivable multi-way valves can rather be controlled using the motor arrangement in accordance with the present disclosure.

FIGS. 1-3 show example configurations with relative positioning of the various components and shapes of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. Additionally, the figures illustrate complex shapes, projections, tabs, indents, profiles, notches, edges, and various surfaces relative to each other.

The invention claimed is:

1. A motor arrangement for controlling pilot valves, comprising at least three motors, wherein the at least three motors comprise at least one stator each and at least one rotor each, and wherein the motors couple to a common rotating shaft at the shaft via at least one respective mechanical coupling, wherein the coupling comprises at least one outer coupling part, at least one inner coupling part and at least one yoke spring, with the yoke spring coupling the outer coupling part and the inner coupling part to one another in normal operation of the corresponding motor and decoupling them from one another in improper operation.

2. The motor arrangement in accordance with claim 1, wherein at least one respective electrical position sensor is provided at each motor.

3. The motor arrangement in accordance with claim 1, wherein the rotor is coupled to the outer coupling part by means of pins and by means of at least one ring.

4. The motor arrangement in accordance with claim 1, wherein two couplings are provided between at least two motors.

5. The motor arrangement in accordance with claim 1, wherein separating disks are provided between at least two couplings.

6. The motor arrangement in accordance with claim 1, wherein couplings which are the same and/or motors which are the same are provided; or in that couplings which are the same and/or motors which are the same are provided offset from one another at a common rotating shaft.

7. The motor arrangement in accordance with claim 2, wherein position sensors which are the same are provided; and/or in that the position sensors are provided within a housing of the motor arrangement; and/or in that the position sensors are coupled to the outer coupling part; and/or in that the position sensors are differential transformers.

8. The motor arrangement in accordance with claim 1, wherein the rotating shaft is supported via dual bearings.

9. A motor arrangement for controlling pilot valves, comprising:
at least three motors, wherein the at least three motors comprise at least one stator each and at least one rotor each, and wherein the motors couple to a common rotating shaft at the shaft via at least one respective mechanical coupling, the coupling having two exterior cylindrical surfaces, one smaller than the other and each having different, but parallel, central axes, wherein the two exterior cylindrical surfaces are releasably connected to one another by a yoke spring.

10. The motor arrangement in accordance with claim 9, wherein at least one position sensor couples the at least one respective mechanical coupling.

11. The motor arrangement in accordance with claim 9, wherein the motors coupled to the shaft with a mechanical coupling are spaced apart from one another in an axial direction, the motors and at least one mechanical coupling extending radially outwardly away from the shaft.

12. The motor arrangement in accordance with claim 9, wherein the smaller exterior cylindrical surface connects to the motor, and the other exterior cylindrical surface connects to the shaft.

13. The motor arrangement in accordance with claim 9, wherein at a threshold the yoke spring yields and allows relative rotary movement between the two exterior cylindrical surfaces.

14. The motor arrangement in accordance with claim 9, wherein the mechanical coupling comprises separate couplings that connect the rotors to the rotating shaft.

15. The motor arrangement in accordance with claim 9, wherein the smaller exterior cylindrical surface comprises a fork section that at least partly supports the other exterior cylindrical surface.

16. The motor arrangement in accordance with claim 9, wherein the two exterior cylindrical surfaces further comprise abutments to provide resistance for relative movement between the two surfaces.

17. The motor arrangement in accordance with claim 10, wherein the pilot valve is controlled by the at least three motors in parallel, and wherein the pilot valve is coupled to the motors via the respective couplings.

18. The motor arrangement in accordance with claim 17, wherein the motors are decoupled from the pilot valve individually depending on the operating condition.

* * * * *